(12) United States Patent
Uppgard et al.

(10) Patent No.: US 6,176,170 B1
(45) Date of Patent: Jan. 23, 2001

(54) HYDRAULIC ACTUATOR WITH SHOCK ABSORBING CAPABILITY

(75) Inventors: Darin C. Uppgard, Neshkoro; Martin E. Olson Gunderson, Green Bay; Kerry J. Treinen, Malone; Jeremy L. Alby, Oshkosh, all of WI (US)

(73) Assignee: Brunswick Corporation, Lake Forest, IL (US)

( * ) Notice: Under 35 U.S.C. 154(b), the term of this patent shall be extended for 0 days.

(21) Appl. No.: 09/261,896

(22) Filed: Mar. 3, 1999

(51) Int. Cl.[7] ..................................................... F15B 11/08
(52) U.S. Cl. ................................................ 91/422; 440/61
(58) Field of Search ................................. 91/422; 440/61

(56) References Cited

U.S. PATENT DOCUMENTS

| | | | |
|---|---|---|---|
| 3,999,502 | 12/1976 | Mayer | 115/41 |
| 4,041,840 | * 8/1977 | Zirps | 91/422 X |
| 4,050,359 | 9/1977 | Mayer | 92/113 |
| 4,168,800 | 9/1979 | Quick | 239/164 |
| 4,258,609 | * 3/1981 | Conway | 91/422 X |
| 4,308,018 | * 12/1981 | Nakamura et al. | 440/61 |
| 4,363,629 | 12/1982 | Hall | 440/61 |
| 4,375,181 | * 3/1983 | Conway | 91/422 X |
| 4,493,659 | 1/1985 | Iwashita | 440/61 |
| 4,784,625 | 11/1988 | Nakahama | 440/61 |
| 5,094,081 | * 3/1992 | Osborne | 91/422 X |
| 5,392,690 | 2/1995 | Hundertmark | |
| 5,584,225 | 12/1996 | Arvidsson et al. | 91/405 |
| 5,720,637 | * 2/1998 | Nakamura | 440/61 |
| 5,802,953 | * 9/1998 | Nakamura | 91/422 |
| 5,882,235 | * 3/1999 | Nakamura | 440/61 |

FOREIGN PATENT DOCUMENTS

| | | | |
|---|---|---|---|
| 1650634 | * 2/1970 | (DE) | 91/422 |
| 806915 | * 2/1981 | (RU) | 91/422 |

* cited by examiner

*Primary Examiner*—John E. Ryznic
(74) *Attorney, Agent, or Firm*—William D. Lanyi

(57) ABSTRACT

A shock absorbing hydraulic actuator comprises a cylinder with first and second pistons slidably disposed therein. The first and second pistons are moveable relative to each other. A poppet is supported by the first piston and is moveable relative to the first piston. In response to hydraulic fluid pressure within a passage of the first piston, the poppet can be caused to move in a direction which opens a passage through the first piston to allow the first piston to move relative to the second piston in response to a shock impact such as that which can result from an outboard motor striking a submerged or floating object. The second piston remains in its original position. A bleed passage allows the first piston to resume its original position next to the second piston after the impact has occurred. This movement towards its original position is caused naturally by the weight of an object supported by the hydraulic actuator, such as an outboard motor.

19 Claims, 7 Drawing Sheets

HYDRAULIC ACTUATOR WITH SHOCK ABSORBING CAPABILITY

BACKGROUND OF THE INVENTION

1. Field of the Invention

The present invention is generally related to a hydraulic actuator which can withstand a shock load and automatically return to its original position and, more particularly, to a hydraulic actuator used as a trim and tilt cylinder for a marine drive system, such as an outboard motor.

2. Description of the Prior Art

Those skilled in the art of hydraulic actuators are familiar with trim cylinders that are capable of withstanding a shock load and subsequently returning to the original position before the shock load occurred.

U.S. Pat. Nos. 3,999,502 and 4,050,359, which issued to Mayer in 1976 and 1977, respectively, disclose a hydraulic power trim and power tilt system for a combined power trim and shock absorbing piston-cylinder unit of an outboard motor. The system includes a reversal pump means having a trim-up port connected by pressure responsive pilot valve and a trim-down port through a reverse lock solenoid valve. A down-pilot spool valve provides full drain flow for trim-up and power flow for trim-down. An "up-reverse" pilot valve with a pressure operator is in parallel with the reverse lock valve and provides a restricted by-pass for limited trim-up in reverse. The trim-up hydraulic input or powered side of the cylinder units defines a trapped hydraulic system creating "memory" in the system so that after an impact occurs the motor can return to the original trim position. The return side permits relatively free-flow to permit "trail-out" under low impact. At high speed impact, the flow is restricted and the and the pressure within the cylinder increases. At a selected point, a shock valve within the piston-cylinder opens and absorbs the shock forces. The piston unit includes an inner floating head which is telescoped into a head secured to the piston rod with a chamber thereby formed to store the liquid flow during shock movement. A metered orifice and check valve allows return to the original trim-set position.

U.S. Pat. No. 4,493,659, which issued to Iwashita on Jan. 15, 1985, describes a tilt-lock mechanism. The mechanism is intended for vertically tiltable outboard stem drive units on a marine vessel and preferably includes a hydraulic cylinder device dampingly connecting the drive unit and the vessel. The mechanism preferably includes apparatus allowing the operator to selectively prevent or allow the drive unit to freely tilt under various operating conditions.

U.S. Pat. No. 5,392,690, which issued to Hundertmark on Feb. 28, 1995, describes a marine power steering system. The system is intended for operation of a power steering assembly includes a pressure accumulator to provide pressurized hydraulic fluid and valving that permits the transfer of hydraulic fluid within the cylinder to provide efficient use of hydraulic fluid.

U.S. Pat. No. 4,784,625, which issued to Nakahama on Nov. 15, 1988, describes a tilt lock mechanism for a marine propulsion device. The tilt locking and shock absorbing arrangement for a marine outboard drive embodies a single cylinder and piston assembly for controlling the tilt and trim positions of the drive and for further absorbing shocks applied to it. An accumulator arrangement is provided which has gas over oil and is valved into the system in such a way as to retard passage of the gas into the shock absorbing device per se and which will return any escaped gas back to the accumulator.

U.S. Pat. No. 5,584,225, which issued to Arvidsson et al on Dec. 17, 1996, describes a hydraulic cylinder, especially a trim and tip cylinder for outboard type boat propeller drive units. The hydraulic cylinder is provided with a piston that has axial channels with check valve permitting fluid flow in one direction from one cylinder chamber to the other. Constricting means in the form of a spring-biased plate is displaceably mounted on the piston rod covers. After a certain displacement of the piston, a portion of the outlet opens to reduce the flow through the cross-sectional area and brake the piston movement.

U.S. Pat. No. 4,363,629, which issued to Hall et al on Dec. 14, 1982, describes a hydraulic system for an outboard motor with sequentially operating tilt and trim means. The marine propulsion device comprises a transom bracket adapted to be connected to boat transom. It further includes a first pivot connecting a stern bracket to the transom bracket for pivotal movement of the stem bracket relative to the transom bracket about a first axis which is horizontal when the transom the transom bracket is mounted on a boat. A second pivot connects the swivel bracket to the stem bracket below the first pivot for pivotable movement of the swivel bracket with the stem bracket and relative to the stem bracket about a second pivot axis that is parallel to the first pivot axis. A king pin pivotally connects a propulsion unit, including a rotatably mounted propeller, to the swivel bracket for steering movement of the propulsion unit relative to the swivel bracket about a generally vertical axis and for common pivotal movement with the swivel bracket in a vertical plane about the first and second horizontal axes. A trim cylinder-piston assembly is pivotally connected to the stern bracket and to the swivel bracket. A tilt cylinder-piston assembly is pivotally connected to the transom bracket and to the stern bracket. A fluid conduit system communicates between the source of pressure fluid in each of the tilt cylinder-piston piston assembly and the trim cylinder-piston assembly. The system further includes apparatus which is operable, during reverse operation of the propulsion unit, for causing initial full extension to the trim cylinder-piston assembly, followed by extension of the tilt cylinder-piston assembly. It also causes initial full contraction of the tilt cylinder-piston assembly followed by subsequent contraction of the trim cylinder-piston assembly.

U.S. Pat. No. 4,168,800, which issued to Quick on Sep. 25, 1979, describes a combination hydraulic cylinder and shock absorber. The combined hydraulic cylinder and shock absorber is used in combination with a cantilever supported boom having a plurality of longitudinally spaced discharge nozzles thereon for a flowable material with one end of the boom being pivotally supported from a vehicle, or the like, for vertical adjustment in a vertical plane with a hydraulic cylinder enabling angular adjustment of the boom about a horizontal axis and including a structure which provides a shock absorber to dampen and cushion vertical oscillation or bouncing movement about a horizontal axis as the boom and vehicle transverse uneven terrain such as when applying liquid fertilizer or other flowable material agent to the soil.

All of the patents described above are hereby expressly incorporated by reference within the present specification.

Known hydraulic actuators with shock absorbing capability typically use at least one piston, disposed within the cylinder, which has a plurality of passages through the piston in which check valves are located. Each check valve typically uses a ball and spring combination to maintain the passages in a closed status until a preselected pressure overcomes the spring force to move the ball and open the passages. Since devices of this type are intended to react to a sudden change in pressure in one chamber of the cylinder, the effective area of each ball exposed to the pressure must be carefully sized so that the resulting force on the ball does not easily overcome the force of the spring which opposes movement of the ball toward an open position. Since a certain flow must be accommodated through the piston when sudden shock loads are experienced, a plurality of check valves must be provided so that the accumulated area of all of the passages is sufficient to allow the required flow to pass through the piston. In most known systems, five to seven passages must be provided through the piston to allow the required flow volume while also allowing the balls of the check valves to be supported in a closed position by springs of reasonable size and strength.

Since the innovative development of the hydraulic power trim and power tilt system described in U.S. Pat. Nos. 3,999,502 and 4,050,359 was originally developed, most subsequently developed cylinders with shock absorbing capability have followed the basic technique described in these patents by Mayer. As a result, most known shock absorbing trim cylinders and tilt cylinders require that numerous check valves be provided in the trim piston. As a result, each cylinder requires the expensive assembly of finely machined spheres into finely machined passages through the piston. The spheres are typically peened in place and a spring is assembled into each passage to provide a force that maintains the machined ball in a closed position to prevent the flow of hydraulic fluid through the trim piston when no shock forces exist.

The use of a plurality of check valves in prior art shock absorbing cylinders increases the cost of those devices. In addition, the balls and their respective seats must be accurately machined to provide an adequate seal so that fluid flow through the piston passages is prevented except during the occurrence of a shock loading incident. This machining, in addition to the assembly of the many components, increases the cost of the shock absorbing tilt cylinder mechanisms. The machining operation also makes the device more susceptible to contamination from debris. The metal to metal seals created by the peening process is susceptible to leakage from small contaminants or imperfections included during manufacturing at the seal face.

For the reasons described above, it would be significantly beneficial if a shock absorbing hydraulic actuator could be provided which reduces the required number of components and also reduces the highly accurate machining processes that are currently required in actuators known to those skilled in the art.

SUMMARY OF THE INVENTION

The hydraulic actuator made in accordance with a preferred embodiment of the present invention, comprises a cylinder and a first piston which is slidably disposed within the cylinder. It also comprises an actuator shaft that is attached to the first piston and extends through a first end of the cylinder. A second piston is slidably disposed within the cylinder. The first and second pistons are moveable relative to each other to define the volumes of a first chamber between the first piston and the first end of the cylinder, a second chamber between the second piston and a second end of the cylinder, and an intermediate chamber between the first and second pistons.

A preferred embodiment of the present invention further comprises a fluid passage through the first piston. A poppet is supported by the first piston and is moveable relative to the first piston between a closed position blocking the fluid passage and an open position which connects the first chamber and the intermediate chamber in fluid communication with each other. The poppet can be spring actuated to urge the poppet into the closed position. The poppet is moveable into the open position in response to an increase of pressure within the first chamber and the fluid passage beyond a predetermined magnitude. The poppet has first and second effective areas against which pressure within the fluid passage can act. The pressure within the fluid passage acting against the first effective area causes a force on the poppet toward its open position. The pressure within the fluid passage acting against the second effective area causes a force on the poppet toward the closed position. In a preferred embodiment of the present invention, the first effective area is larger than the second effective area. The first and second effective areas are sized to cause the poppet to move from the closed position to the open position in response to the pressure within the first chamber exceeding a predetermined magnitude.

The actuator of the present invention can be attached to a outboard motor for the purpose of moving the outboard motor from one trim or tilt position to another trim or tilt position. The present invention can further comprise a bleed passage formed through the first piston to allow fluid to flow from the intermediate chamber to the first chamber in response to a force on the shaft urging the first piston toward the second piston. The poppet can be slidably disposed within a first cavity formed within the shaft of the actuator and a distal end of the poppet can extend into a second cavity formed within the first piston. The second cavity can be a portion of the fluid passage. The second piston can be cup-shaped to receive the distal end of the poppet within the second piston when the first and second pistons are proximate each other.

BRIEF DESCRIPTION OF THE DRAWINGS

The present invention will be more fully and completely understood from a reading of the description of the preferred embodiment in conjunction with the figures in which.

DESCRIPTION OF THE PREFERRED EMBODIMENT

Figure 1:
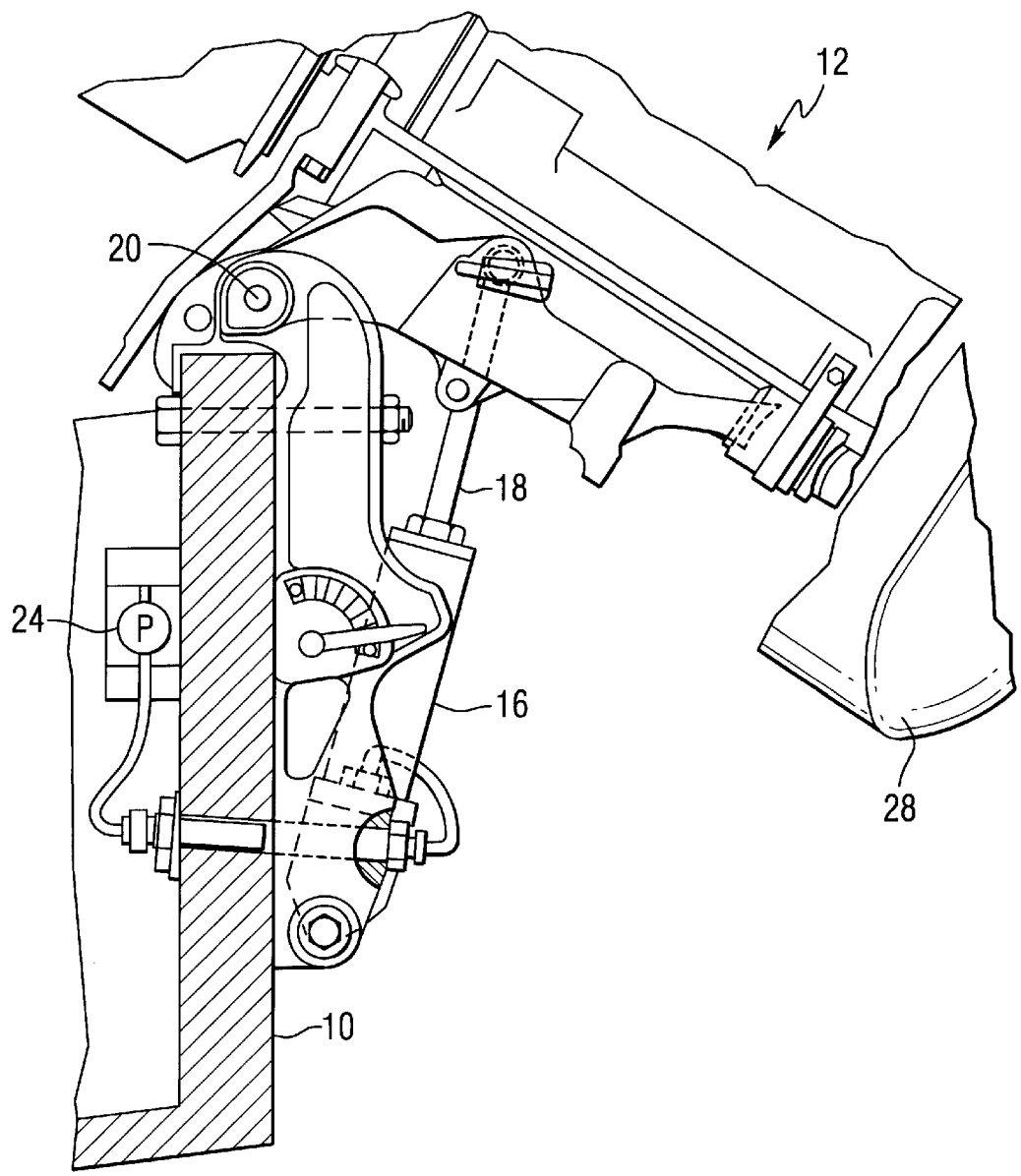
FIG. 1 shows an outboard motor supported by an hydraulic actuator.

Throughout the description of the preferred embodiment, like components will be identified by like reference numerals.

FIG. 1 shows the transom 10 of the boat with an outboard motor 12 pivotally attached thereto. A hydraulic actuator, comprising a cylinder 16 and a shaft 18, is used to lift the outboard motor 12 and cause it to rotate about a pivot 20. An actuator, such as the one shown in FIG. 1, also comprises one or more pistons within the cylinder 16. The actuator is used to either tilt the outboard motor 12 to a desired position, such as the one shown in FIG. 1, for the purpose of providing access to the outboard motor or for raising the outboard motor when the boat is transported on a trailer. The actuator can also be used to selectively place the outboard in a desirable trim position relative to the transom 10.

With continued reference to FIG. 1, a pump 24 is used to pressurize hydraulic fluid which is directed to one or the other sides of the piston within the cylinder 16 to cause the shaft 18 to move relative to the cylinder 16.

During normal operation of a boat with an outboard motor 12, the outboard motor is lowered to a position generally vertical and parallel to the transom 10 by causing the shaft 18 to be withdrawn into the cylinder 16. In this position, the outboard motor 12 is used to propel the boat, with the precise trim angle being determined by the position of the shaft 18 within the cylinder 16. When in this position, the lower portion 28 of the outboard motor housing can possibly strike objects which are submerged near the surface of the water or floating on the water as the boat passes over those objects. When the lower portion 28 of the outboard motor 12 strikes an object in this manner, the resulting force on the outboard motor 12 will cause it to rotate counterclockwise about pivot 20 in FIG. 1. This rotation of the outboard motor 12 about pivot 20 is resisted by the hydraulic pressures within the cylinder 16. As is generally known to those skilled in the art, it is highly desirable to have the outboard motor 12 react in a particular manner in response to the striking of a submerged or underwater object. It is desirable to permit movement of the outboard motor in response to hitting floating or submerged objects at any speed, but it is also desirable to dampen the movement when the boat is moving at high speeds to prevent complete rotation of the outboard motor about its pivot point at its transom bracket. In addition, it is necessary to resist forces that tend to rotate the motor about its transom pivot point when the outboard motor is operated in reverse gear. Therefore, it is desirable to resist the extension of the shaft 18 out of the cylinder 16 in a predetermined manner which allows rotation of the outboard motor 12 about pivot 20, but provides sufficient resistance to that rotation to prevent the outboard motor 12 from rapidly spinning about pivot 20 and possibly causing harm to the occupants of the boat.

Following an impact between the lower portion 28 of the outboard motor 12 and a submerged or floating object, it is desirable that the outboard motor 12 return to its trim position with the shaft 18 retracted into the cylinder 16 to its position prior to the impact. This desirable result was achieved through the development of a memory piston as disclosed in U.S. Pat. Nos. 3,999,502 and 4,050,359 which are described above. That technology has been used throughout the years to provide various types of hydraulic actuators with memory components.

Figure 2A:
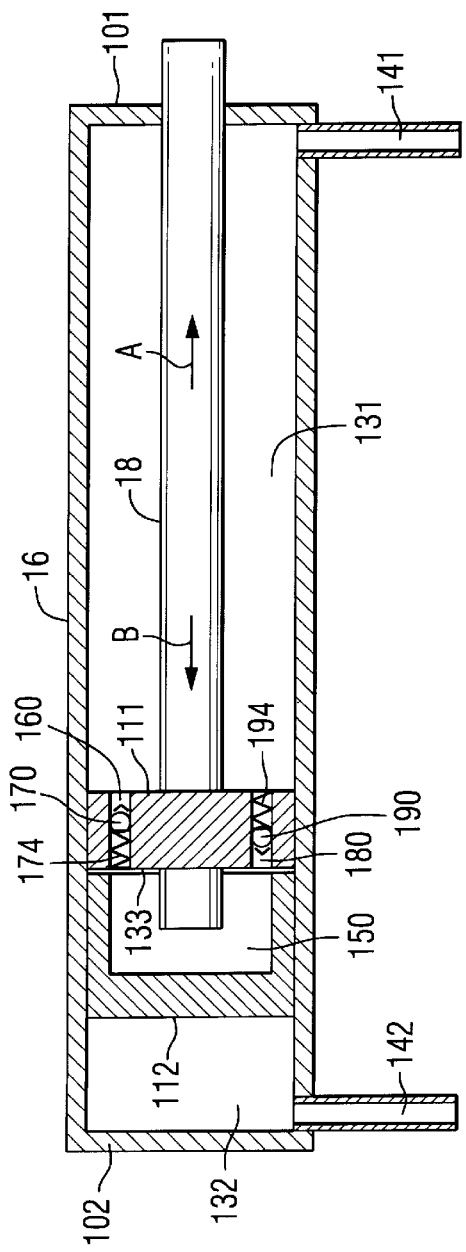
FIGS. 2A and 2B are highly schematic and simplified representations of the hydraulic actuator in two different positions.

In order to fully understand the advantages of the present invention, it is necessary to first understand how a hydraulic actuator with a memory piston operates. With reference to FIG. 2A, a hydraulic actuator is represented in a highly schematic and simplified manner. A cylinder 16 has a first end 101 and a second end 102. A first piston 111 is slidably disposed within the cylinder 16 for movement left and right in FIG. 2A. An actuator shaft 18 is attached to the first piston 111. A second piston 112 is slidably disposed within the cylinder 16. The first and second pistons, 111 and 112, are movable relative to each other to define the volumes of a first chamber 131, a second chamber 132, and an intermediate chamber 133. The first chamber 131 is the space between the first piston 111 and the first end 101 of cylinder 16. The second chamber 132 is the space between the second end 102 of the cylinder 16 and the second piston 112. The intermediate chamber 133 is the space between the first and second pistons, 111 and 112.

Under normal operating conditions, the first and second piston, 111 and 112, are located proximate each other as illustrated in FIG. 2A. They move together in response to changes in the relative pressures of the first chamber 131 and the second chamber 132. To cause the shaft 18 to move in the direction of arrow A, hydraulic fluid is pumped through conduit 142 into the second chamber 132 and hydraulic fluid is allowed to flow out of conduit 141 from the first chamber 131. This moves the first and second pistons toward the right in FIG. 2A and extends the shaft 18 out of an opening formed through the first end 101 of cylinder 16. Conversely, the shaft 18 can be retracted back into the cylinder 16 allowing hydraulic fluid to flow out of the second chamber 132 through conduit 142.

During normal operation of the hydraulic actuator, the first and second pistons, 111 and 112, are in contact with each other and move together as a unit within the cylinder 16. The volume of the intermediate chamber 133 is determined by an opening 150 in the cup-shaped second piston 112 and any concave portions of either the first or second pistons in their facing surfaces. At least one fluid passage 160 is provided through the first piston 111 and a valve construction is contained within the fluid passage. The valve construction can comprise a ball 170 and a spring 174. The ball 170 is placed against a machined seat to prevent flow of fluid from the intermediate chamber 133 into the first chamber 131. The spring 174 prevents the flow of hydraulic fluid from the first chamber 131 into the intermediate chamber 133 unless the relative pressures of the fluids in the first chambers 131 and the intermediate chamber 133 exceeds a preselected magnitude which is sufficient to cause a force on the ball 170 which compresses the spring 174 and opens the conduit 160 to allow fluid to flow in a direction from right to left in FIG. 2A from the first chamber 131 to the intermediate chamber 133. Although only one fluid passage 160 is shown in FIG. 2A, it should be understood that a plurality of similarly constructed passages and valves are provided in the first piston to properly select the required amount of cross sectional area of the passages that allows sufficient hydraulic fluid to pass from right to left through the first piston 111 in the event that a sudden shock force occurs on the shaft 18 in the direction represented by arrow A. When that type of shock force occurs, as in reaction to the striking of a submerged or floating object by the lower portion 28 of the outboard motor 12 in FIG. 1, the relative pressures of the hydraulic fluids in the first chamber 131 of the intermediate chamber 133 exceed a preselected differential magnitude and cause the ball 170 to compress the spring 174 and open the passage 160. Through the plurality of passages 160, hydraulic fluid rapidly flows from the first chamber 131 into the intermediate chamber 133 and allows the first piston 111 to move toward the right in FIG. 2A. The shaft 18 is therefore allowed to extend out from the cylinder 16 in response to the forces of the collision between the lower portion 28 of the outboard motor 12 and a submerged or floating object. Although the structure shown in FIG. 2A resists the rotation of the outboard motor 12 about pivot 20, it allows the rotation to occur, but it slows the rotation to an acceptable degree. During the collision, the second piston 112 acts as a memory piston and remains in its original position within the cylinder 16. Following the collision, the weight of the outboard motor 12 exerts a force on the shaft 18 in the direction represented by arrow B. This creates a pressure differential between the intermediate chamber 133 and the first chamber 131. A bleed passage 180 is provided with a valve that comprises a ball 190 and a spring 194. If the relative pressures between the intermediate chamber 133 and the first chamber 131 exceed a predetermined magnitude, a force is provided against the ball 190 which compresses the spring 194 and allows fluid to bleed from the intermediate chamber 133 to the first chamber 131. This allows the first piston 111 to move from the right to the left in FIG. 2A and return to its normal position.

Figure 2B:
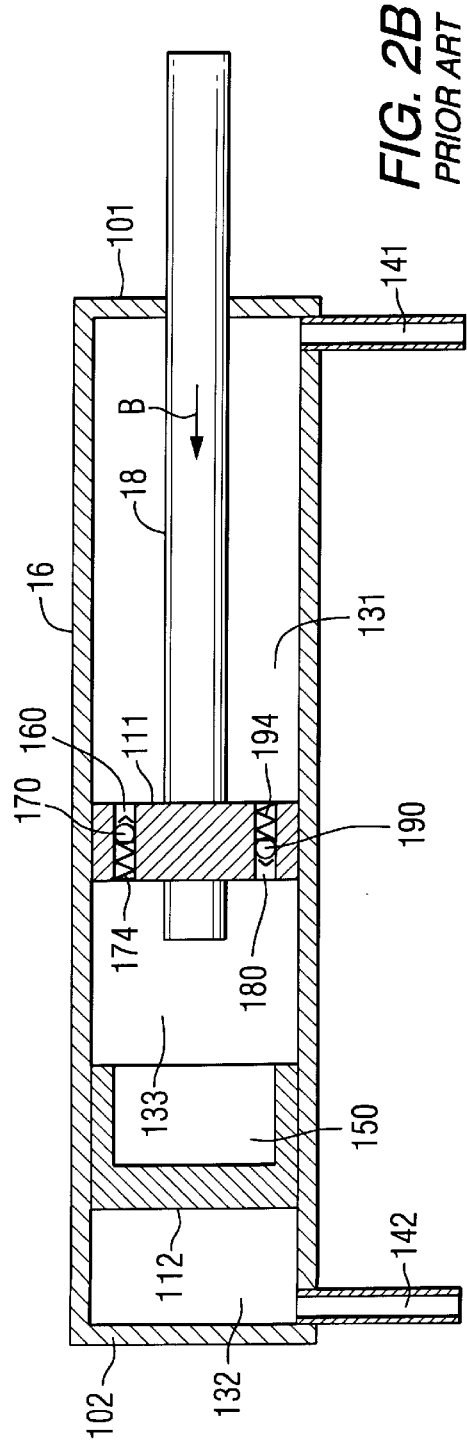

FIG. 2B shows the hydraulic actuator immediately after the impact which caused the first piston 111 to move toward the right and away from the second piston 112. It can be seen that the second piston 112 acted as a memory piston and remained in its original position within the cylinder 16. After the collision is completed, the weight of the outboard motor 12 pushes the shaft 18 in the direction represented by arrow B in FIG. 2B and urges the first piston 111 toward the left. This creates the pressure differential between the intermediate chamber 133 and the first chamber 131 which is sufficient to force ball 190 of the bleed passage 180 toward the right and open the bleed passage. This, in turn, allows the hydraulic fluid to bleed from the intermediate chamber 133 to the first chamber and allows the first piston 111 to return to its position abutting the second piston 112. In this way, the second piston 112 or memory piston, maintains the original position during an immediately subsequent to the collision so that the first piston 111 could return to its original position as shown in FIG. 2A.

FIGS. 2A and 2B show the general way in which known hydraulic actuators with shock absorbing capability operate. The first piston 111 requires a plurality of passages 160 formed through it. The precise number of passages 160 and the precise size of the cross sectional area of each passage 160 is determined as a function of the anticipated pressures within the first chamber 131 and intermediate chamber 133 under various normal conditions and also when a collision occurs between the lower portion 28 of the outboard motor 12 and a submerged or floating object. The total cross sectional area of all of the passages 160 must be sufficient to allow adequate flow of fluid, in a rapid manner, from the first chamber 131 to the intermediate chamber 133 during a collision. However, the effective areas of each passage 160 must be sufficiently small to allow a spring 174 to adequately resist the movement of the ball 170 from the right to the left in FIGS. 2A and 2B unless the appropriate pressure differential occur. This typically requires between five and seven passages 160 formed through the first piston 111. During normal operation, leakage must be prevented from occurring through the passages 160. To prevent this leakage, the ball 170 must be accurately machined to a precise surface condition and size. Furthermore, the ball seat must be accurately machined so that when the ball is seated in the ball seat, no fluid can pass through the passage 160 unless spring 174 is compressed. The ball 160 is then retained in its proper position by peening an internal surface of the passage 160. It can be seen that these accurate machining operations and the required assembly procedures can significantly increase the cost of an actuator.

Figures 3A, 3B:
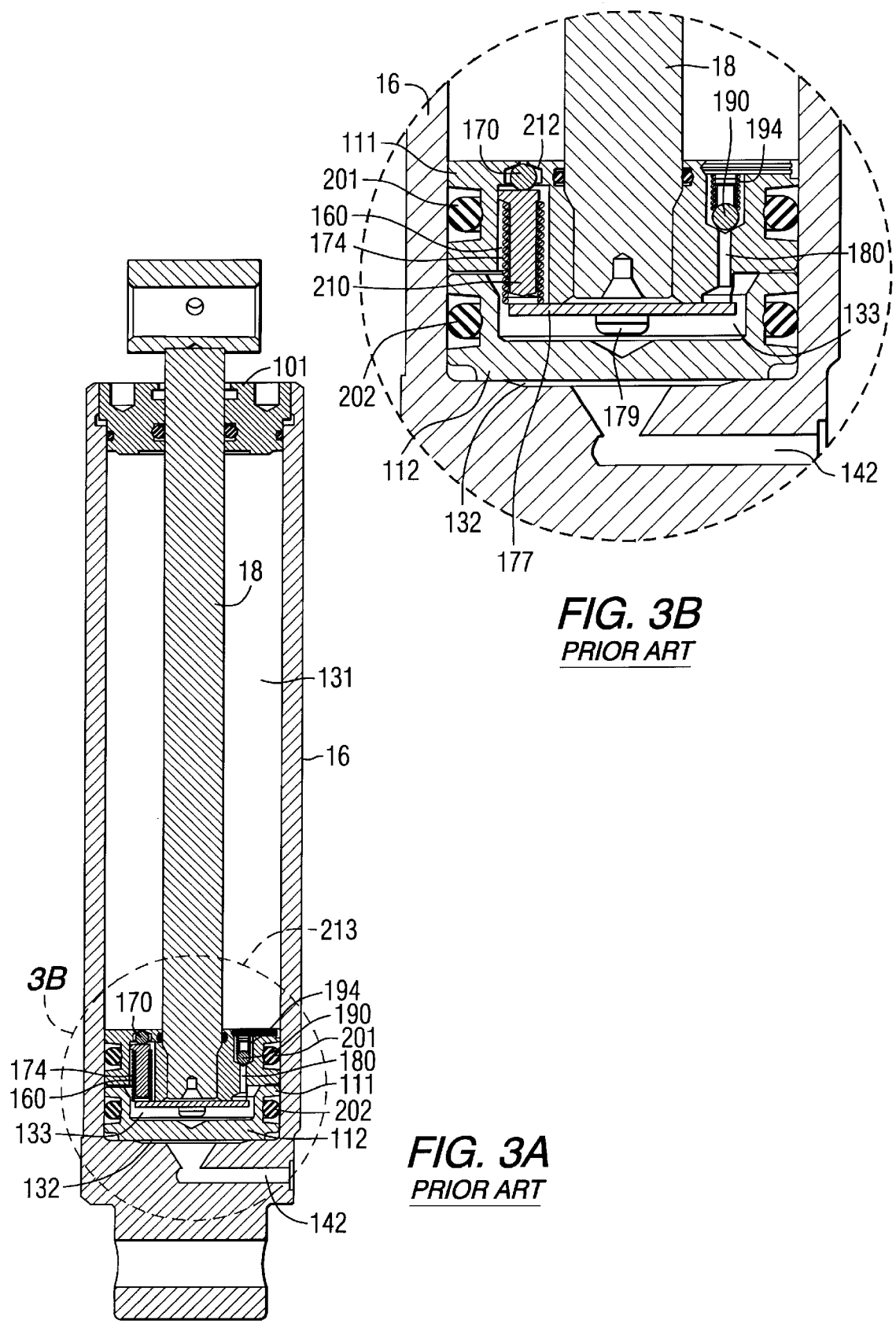
FIGS. 3A and 3B are sectional views of a hydraulic actuator known to those skilled in the art.

FIGS. 3A and 3B show sectional views of the hydraulic actuator known to those skilled in the art. The same components described above in conjunction with the simplified illustrations of FIGS. 2A and 2B are also shown in FIGS. 3A and 3B. The first piston 111 and the second 112 are slidable within the cylinder 16 and can move relative to each other as described above. A plurality of passages 160 are provided through the first piston 111. Each passage 160 is provided with a check valve that comprises a ball 170 that is held in position by a spring 174. The spring 174 holds the ball 170 against a machined ball seat to prevent a flow of fluid through the passage 160 unless the pressure in the first chamber 131 is sufficiently greater than the pressure in the intermediate chamber 133 to provide a force on ball 170 that is sufficient to compress the spring 174 and open the passage 160. Also shown in FIGS. 3A and 3B are two O-rings, 201 and 202. O-ring 201 provides a seal between the first piston 111 and the inner cylindrical wall of cylinder 16. O-ring 202 provides a seal between the second piston 112 and the inner cylindrical wall of cylinder 16. A spring keeper 210 is used to hold the spring 174 in position and to push against the ball 170 to maintain it in its proper position relative to the ball seat 212. As described above, the ball seat must be accurately formed so that the ball 170 seats properly against it to prevent a flow of fluid through the passage 160 except when sufficient force pushes the ball 170 downward in FIGS. 3A and 3B to compress the spring 174 and open the passage 160. In a typical application, such as the hydraulic actuator shown in FIGS. 3A and 3B, between five and seven passages 160 are provided. This requires five to seven balls 170, five to seven spring keepers 210, five to seven springs 174 and the assembly of all these components into the five to seven passages 160. Furthermore, a washer 177 is required to hold the components in place within the openings formed in the first piston 111. The washer 177 is fastened to the first piston 111 by a plurality of fasteners 179. In addition, a single bleed passage 180 is usually provided with a valve which comprises a ball 190 and, optionally, a spring 194. The use of five to seven balls and ball seats provide numerous possibilities for leakage paths to form. This significantly reduces the reliability of the device. The required machining and assembly procedures for producing a hydraulic actuator such as that shown in FIGS. 3A and 3B can be significant. This increases the cost of the actuator. It can be seen that the illustration of FIG. 3B is an expanded view of the components encompassed by dashed line 213 in FIG. 3A.

Figures 4A, 4B:
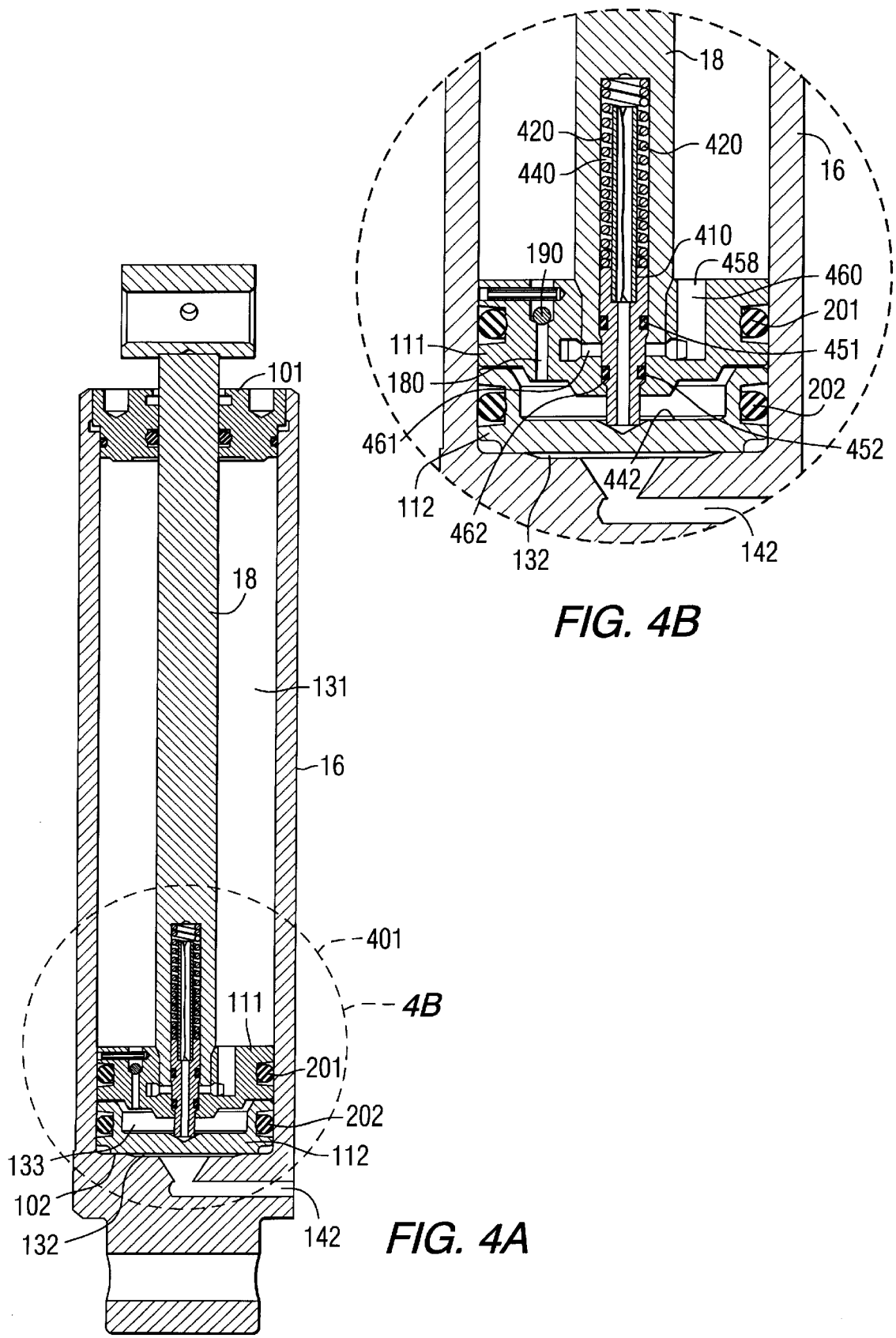
FIGS. 4A and 4B are sectional views of a hydraulic actuator made in accordance with the present invention.

FIGS. 4A and 4B show sectional views of the hydraulic actuator made in accordance with the present invention. It can be seen that FIG. 4B is an enlarged view of the components encompassed by dashed line 401 in FIG. 4A. Like hydraulic actuators made in accordance with the prior art, the present invention comprises a cylinder 16 that has a first end 101 and a second end 102. A first piston 111 and a second piston 112 are disposed within the cylinder 16 and are slidable, in a vertical direction in FIG. 4A, within the cylinder 16. It can be seen that the present invention does not incorporate passages 160 which each include a ball 170 and a spring 174 in the manner described above in conjunction with the prior art. Instead, the present invention incorporates a poppet 410 which is supported by the first piston 111. The poppet 410 is moveable relative to the first piston 111 between a closed position, such as that represented in FIG. 4B, and an open position wherein the poppet 410 is raised relative to the first piston 111 and the spring 420 is compressed. The poppet 410 is disposed within a first cavity 440 which, in the embodiment shown in FIGS. 4A and 4B, is formed within the shaft 18. The shaft 18 is, in turn, threaded into the first piston 111 as shown in the Figures. A first poppet O-ring 451 provides a seal between the poppet 410 and the inner cylindrical surface of the first cavity 440.

With continued reference to FIGS. 4A and 4B, a fluid passage 460 is provided by drilling a plurality of holes 458 axially through the first piston 111 and also providing an undercut region 461 which intersects the holes. Except for the presence of the poppet 410 in its closed position as shown in FIGS. 4A and 4B, fluid could pass between the first chamber 131 and the intermediate chamber 133 by flowing through the plurality of holes 458 and undercut region 461 of the fluid passage 460. The fluid passage 460 also comprises the hole 462 formed through the first piston 111 in which the second poppet O-ring 452 is disposed.

With particular reference to FIG. 4B, it can be seen that the diameter of the inside surface of the first cavity 440 is larger than the diameter of the hole 462. As a result, the surface sealed by the first poppet O-ring 451 is greater in diameter than the surface sealed by the second poppet O-ring 452.

If the poppet 410 is raised relative to the first piston 111, by compressing the spring 420, the second poppet O-ring 452 can be raised out of hole 462. This would open the fluid passage 460 that comprises a plurality of holes 458 formed axially into the first piston 111 in a direction generally parallel with shaft 18, the undercut portion 461 of the first piston 111, and the hole 462 formed through the first piston.

The pressure in the first chamber 131 is the same as the pressure within the fluid passage 460 and the undercut region 461. That same pressure acts upwardly against the poppet 410 over an effective area which is defined by the diameter of the inner cylindrical surface of the first cavity 440. This first effective area is also defined by the outside diameter of the first poppet O-ring 451 because that first poppet O-ring is in sealing contact with the inner cylindrical surface of the first cavity 440. A second effective area is defined by the inner diameter of the cylindrical surface of hole 462 which is the same as the outer diameter of the second poppet O-ring 452. The pressure of the hydraulic fluid within the fluid passage 460 and the undercut region 461 provides an upward force against the poppet 410 determined by the first effective area and provides a downward force against the poppet 410 defined by the second effective area. The first effective area is larger than the second effective area and, as a result, a net upward force always exists against the poppet 410. However, the downward force provided by the spring 420 is usually greater than the net upward force provided by the pressure against the first and second effective areas. When the pressure in the first chamber 131 and the fluid passage 460 exceeds a predetermined value, which is a function of the spring 420, the poppet 410 is moved upward relative to the first piston 111. When the poppet 410 is moved upward by a sufficient distance to move the second poppet O-ring 452 out of the hole 462, the fluid passage 460 is moved to an open position and hydraulic fluid can flow from the first chamber 131 to the intermediate chamber 133. This occurs when the lower portion 28 of the outboard motor 12 strikes an object and suddenly forces the shaft 18 upward and out of the cylinder 16. When this occurs, the sudden increase in the pressure of the hydraulic fluid in the first chamber 131 exceeds the predetermined magnitude and the net upward force on the poppet 410 is able to compress the spring 420 and open the fluid passage 460. This allows hydraulic fluid to flow into the intermediate chamber 133 and also allows the first piston 111 to move upward in the cylinder 16 with the shaft 18.

With continued reference to FIGS. 4A and 4B, it can be seen that the function of a shock absorbing piston is achieved through the use of a single poppet 410 and a single spring 420. The plurality of balls 170 and springs 174, as described above in conjunction with FIGS. 2A, 2B, 3A, and 3B, are not necessary in the present invention as illustrated in FIGS. 4A and 4B. In addition, the present invention utilizes no ball seats which require accurate machining and which are used in combination with balls that must also be machined to accurate tolerances and with smooth surfaces to prevent bypass leakage through the passages 160 of the prior art actuators. Another advantage of the present invention is that is provides soft O-ring seals instead of the metal to metal seals in the prior art. The soft O-ring seals provide improved sealing and increased resistance to both defects and contaminations. The present invention is much simpler and requires fewer components. Furthermore, the assembly of the poppet 410 and spring 420 into the first cavity 440 and hole 462 is much simpler that the assembly of the five to seven balls 170 and five to seven springs 174 in the five to seven passages 160 of the prior art.

With continued reference to FIGS. 4A and 4B, it can be seen that the second piston 112 is cup-shaped and has a second cavity 442 formed therein. The distal end of the poppet 410 extends through the first piston 111 and into the second cavity 442.

The first piston 111 of the present invention also comprises a bleed passage that operates in a manner similar to the bleed passage 180 described above in conjunction with FIGS. 2A and 2B. The bleed passage of the present invention can comprise a ball 190, as in the prior art, or any other suitable arrangement to allow fluid to flow from the intermediate chamber 133 to the first chamber 131 after a collision is completed and the weight of the outboard motor 12 pushes the shaft 18 back into the cylinder 16. This allows the first piston 111 to move toward the second piston 112 to resume its original position that it occupied prior to the collision.

Figure 5:
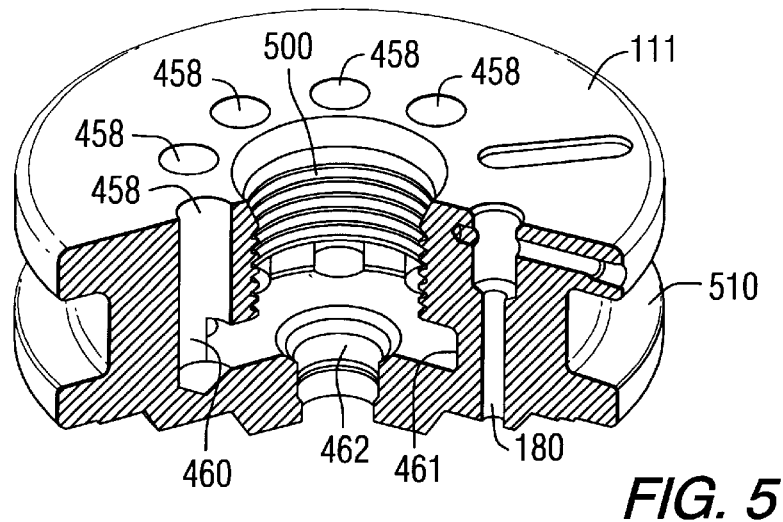
FIG. 5 is an isometric view of a first piston made in accordance with the present invention.

FIG. 5 shows an isometric view of the first piston 111. The plurality of axial holes 458 are formed in the first piston 111 to a depth that is adequate to reach the undercut portion 461 which is an annular groove formed in the inside diameter of the first piston 111. The threaded surface 500 is threaded to receive a threaded end of the shaft 18 as illustrated in FIGS. 4A and 4B. A groove 510 is formed in the outer surface of the first piston 111 to receive the first O-ring 201 described above. The bleed passage 180 is formed in the manner similar to that described above in conjunction with the prior art and is positioned so that it does not intersect with the undercut region 461. However, axial holes 458 do intersect the undercut groove 461 to form the fluid passage 460 described above in conjunction with FIGS. 4A and 4B.

Figures 6A, 6B:
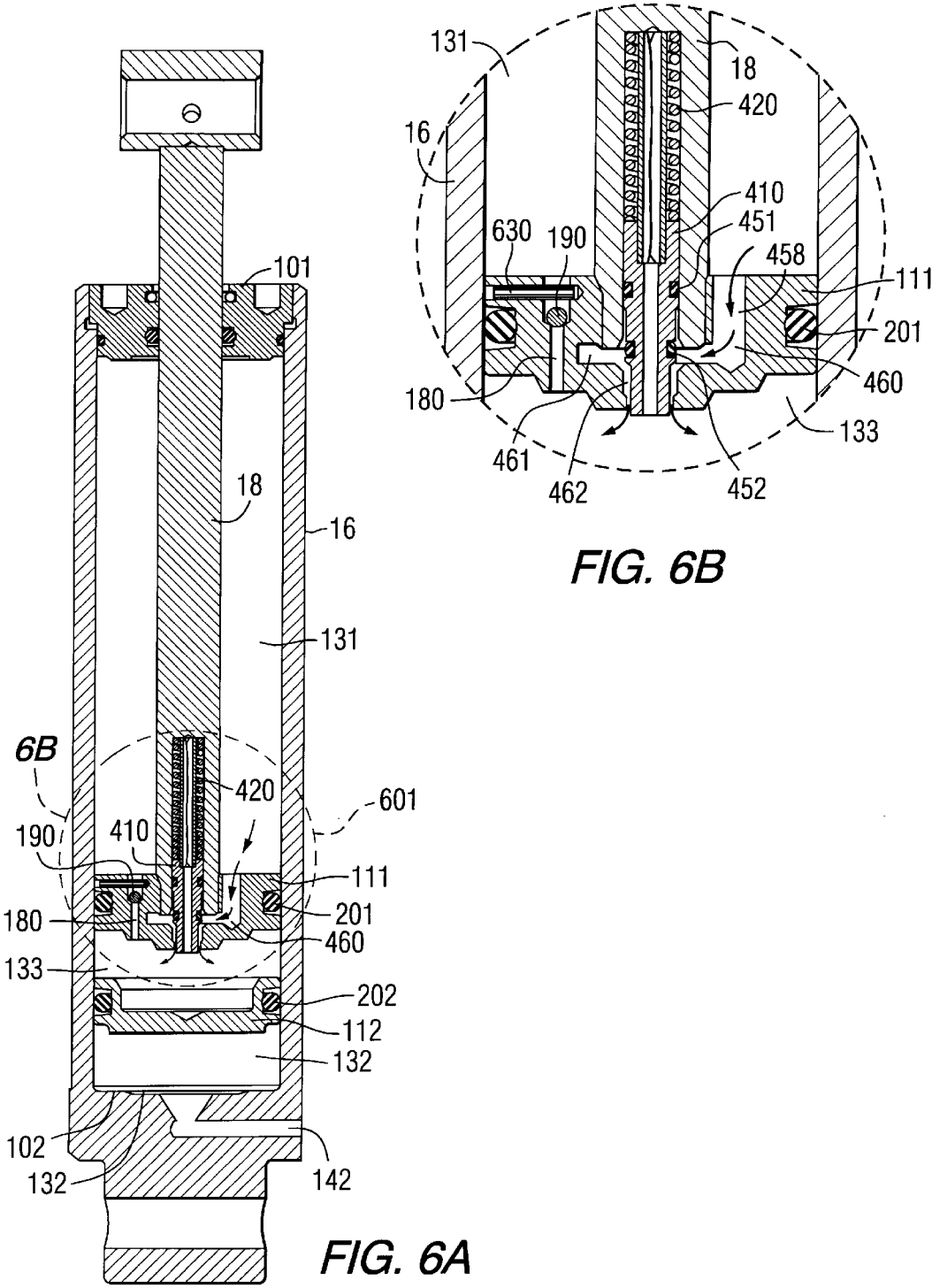
FIGS. 6A and 6B are sectional views of the present invention during a shock loading occurrence.

FIGS. 6A and 6B show the present invention during the instant of an occurrence of a sudden force, in an upward direction, on the shaft 18. This sudden force increases the pressure of the hydraulic fluid in the first chamber 131. For the reasons described in detail above, this pressure in the fluid passage 460 creates an upward force on the poppet 410 which is sufficient to compress the spring 420 and allow the first and second poppet O-rings, 451 and 452, to move upward with respect to the first piston 111. When the second poppet O-ring 452 moves upward out of hole 462, the fluid passage 460 is opened to allow hydraulic fluid to flow, in the directions represented by the arrows in FIGS. 6A and 6B, from the first chamber 131 to the intermediate chamber 133. When this occurs, the first piston 111 can move upward in the cylinder 16 in response to the impact force on the shaft 18. It should be noted that although fluid can flow through the fluid passage 460, the system provides sufficient resistance to that flow to prevent the first piston 111 from suddenly moving all the way to the first end 101 of the cylinder 16. The system absorbs sufficient energy to prevent damage from occurring to the components of the hydraulic actuator or the outboard motor and its associated brackets. If the first piston 111 is not allowed to move from its original position when an impact occurs, severe damage could be caused to the outboard motor which would have to absorb all of the energy from an impact against a floating or submerged object. On the other hand, if the first piston 111 was allowed to move freely without any resistance, an impact at high speed would likely cause the outboard motor to rapidly rotate about its pivot and possibly be thrown into the boat. Both of these extreme conditions are significantly deleterious and the operation of the present invention is intended to avoid both situations.

With continued reference to FIGS. 6A and 6B, it can be seen that the bleed passage is not provided with a spring 194 as described above in conjunction with FIGS. 2A and 2B. It has been determined that a spring is not necessary in the bleed passage. The ball 190 is retained in place by a pin 630 that is inserted through a radial hole to block movement of the ball 190 out of the bleed passage 180 and into the first chamber 131.

Figures 7A, 7B:
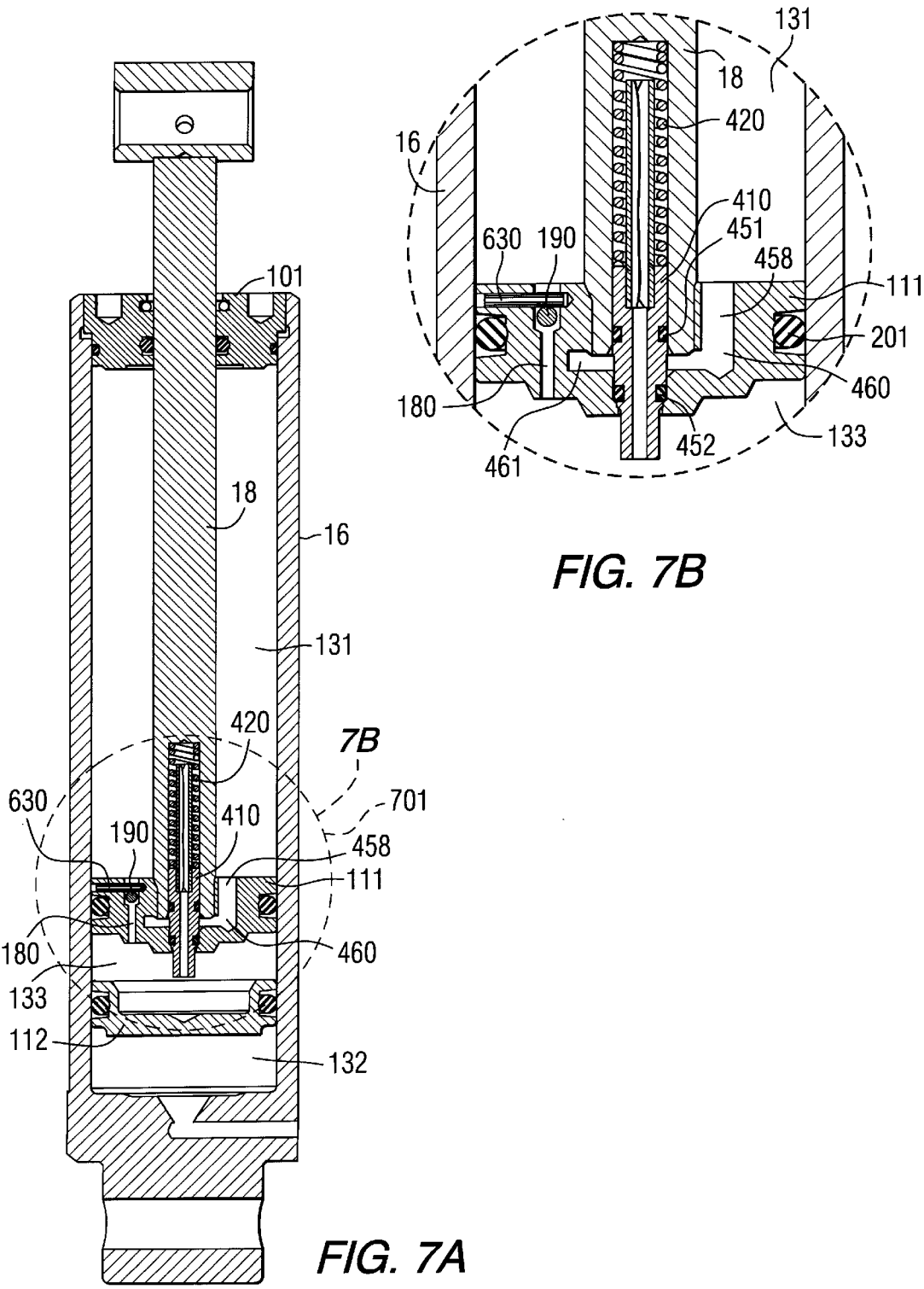
FIGS. 7A and 7B are sectional views of the present invention during a return of the first piston toward the second piston.

FIGS. 7A and 7B show the present invention immediately following the occurrence and cessation of an impact such as that described above in conjunction with FIGS. 6A and 6B. Reference numeral 701 identifies a dashed line which encloses the components in FIG. 7A that are shown in the enlarged section view of 7B. When the impact force on the shaft 18, in an upward direction in FIGS. 7A and 7B, no longer exists, the shaft 18 is subjected to the downward force provided by the weight of the outboard motor. This downward force increases the pressure of the hydraulic fluid in the intermediate chamber 133 to a magnitude that is greater than the pressure of the hydraulic fluid in the first chamber 131. This pressure differential induces a flow of hydraulic fluid through the bleed passage 180 from the intermediate chamber 133 to the first chamber 131. The ball 190 is shown in an upper position against the pin 630. This allows the first piston 111 to move downward with the shaft 18 until the first piston 111 moves into contact with the second piston 112 which did not move during the impact situation. In FIGS. 7A and 7B, the poppet 410 is in its normal closed position and the fluid passage 460 is closed. During the return of the first piston 111 to its position proximate the second piston 112, hydraulic fluid will flow from the intermediate chamber 133 to the first chamber 131 through the bleed passage 180.

Figure 8A:
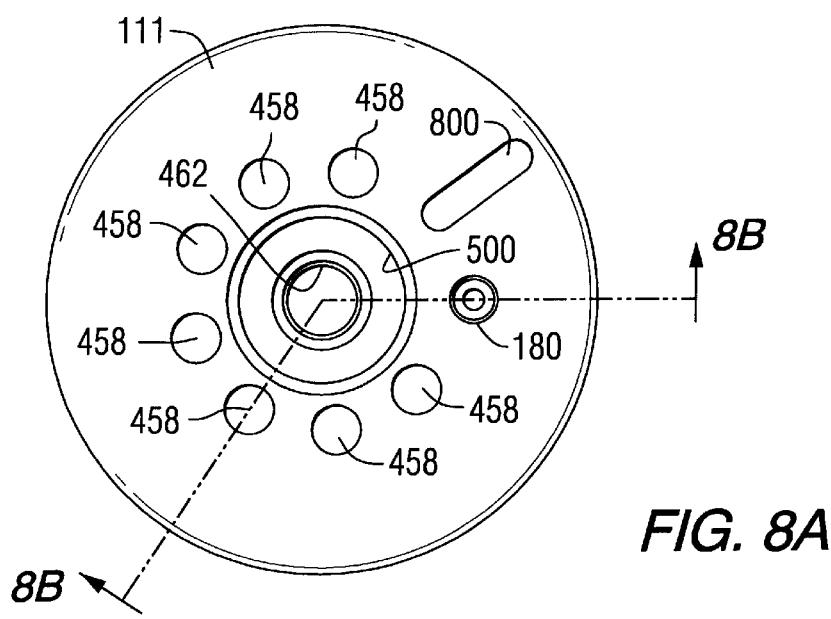
FIGS. 8A and 8B are a top view and a sectional view of the first piston made in accordance with the preferred embodiment of the present invention.
Figure 8B:
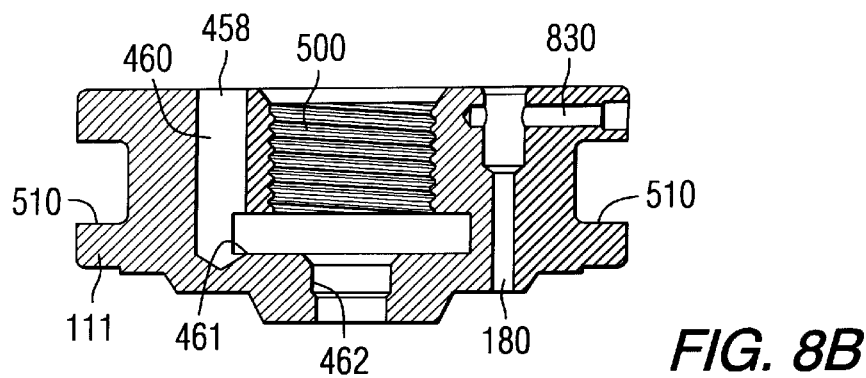

FIGS. 8A and 8B show the first piston 111 in a top view and a section view. In the top view of FIG. 8A, the seven holes 458 are shown formed axially through a portion of the first piston 111. In addition, an indentation, or groove 800, is provided in the upper surface of the first piston 111. With reference to FIGS. 8A and 7A, the purpose of the groove 800 is to provide fluid passage between two portions of the inner surface of the first end 101. If the first piston 111 is moved against the first end 101, the groove 800 assures fluid communication between all radial positions of the first chamber 131.

The top view of FIG. 8A shows the threaded surface 500 that is shaped to receive the shaft 18 in threaded association therein. Also shown is the hole 462 which provides the portion of the fluid passage 460 which is opened or closed, depending on the position of the second O-ring 452. FIG. 8A also shows the bleed passage 180. It should be noted that the bleed passage is located at a different distance from the center of the first piston 111 than the holes 458 used to form the fluid passage 460. The purpose of this position of the bleed passage 180 can be seen in the section view of 8B in which it does not intersect the groove 461.

FIG. 8B shows a hole 458 of the fluid passage 460 intersecting the groove 461. The plurality of holes 458, shown in FIG. 8A, are intentionally positioned so that they intersect the groove 461. In combination with hole 462, the holes 458 and groove 461 form the fluid passage 460 that allows hydraulic fluid to pass from the first chamber 131 to the intermediate chamber 133 when the poppet 410 is moved upward relative to the first piston 111 by a sufficient magnitude to move the second poppet O-ring 452 out of hole 462. The pin 630, described above in FIG. 6B is inserted into the radial hole 830 shown in FIG. 8B.

Comparing the present invention to the prior art, it can be seen that the present invention accomplishes the provision of a shock absorbing piston for a hydraulic actuator without the requirement of a plurality of one-way check valves that each require a ball and a spring. Instead, a single poppet 410 and a single spring 420 accomplish this function. This significant reduction in components reduces the material cost of the actuator and also further reduces the cost of the actuators by eliminating the need to accurately machine the ball seats and balls. Furthermore, the present invention eliminates the assembly costs of assembling the balls and springs into the check valves and fastening those components within the first piston 111.

It can be seen that the present invention provides an effective hydraulic actuator with a shock absorbing capability, but does not require the intricate components and assembly that are required by the prior art. Instead of a plurality of fluid passages 160 which each contain a ball 170 and a spring 174 and which each must be accurately machined to provide a ball seat to receive the ball 170, the present invention only requires a poppet 410 disposed within the first cavity 440 with the spring 420 to accomplish the same purpose.

Although the present invention has been described with particular specificity and illustrated to show a particularly preferred embodiment of the present invention, other embodiments are also within its scope.

We claim:

1. A hydraulic actuator, comprising:
   a cylinder;
   a first piston slidably disposed within said cylinder;
   an actuator shaft attached to said first piston and extending through a first end of said cylinder;
   a second piston slidably disposed within said cylinder, said first and second pistons being movable relative to each other to define the volumes of a first chamber between said first piston and a first end of said cylinder, a second chamber between said second piston and a second end of said cylinder, and an intermediate chamber between said first and second pistons;
   a fluid passage through said first piston; and
   a poppet supported by said first piston, said poppet being movable relative to said first piston between a closed position blocking said fluid passage and an open position which connects said first chamber and said intermediate chamber in fluid communication with each other, said actuator being attached to an outboard motor for the purpose of moving said outboard motor from one trim position to another trim position.

2. The actuator of claim 1, wherein:
   said poppet is spring actuated to urge said poppet into said closed position.

3. The actuator of claim 1, wherein:
   said poppet is movable into said open position in response to an increase of pressure within said first chamber beyond a predetermined magnitude.

4. The actuator of claim 1, wherein:

said poppet has first and second effective areas against which pressure within said fluid passage can act, said pressure within said fluid passage acting against said first effective area causing a force on said poppet toward said open position, said pressure within said fluid passage acting against said second effective area causing a force on said poppet toward said closed position.

5. The actuator of claim 4, wherein:

said first effective area is larger than said second effective area and said first and second effective areas are defined by the sealing surfaces of O-rings.

6. The actuator of claim 5, wherein:

said first and second effective areas are sized to cause said poppet to move from said closed position to said open position in response to the pressure within said first chamber exceeding a predetermined magnitude.

7. The actuator of claim 1, further comprising:

a bleed passage formed through said first piston to allow fluid to flow from said intermediate chamber to said first chamber in response to a force on said shaft urging said first piston toward said second piston.

8. The actuator of claim 1, wherein:

said poppet is slidably disposed within a first cavity formed within said shaft and a distal end of said poppet extends into a second cavity formed within said first piston, said second cavity being a portion of said fluid passage.

9. The actuator of claim 1, wherein:

said second piston is cup-shaped to receive a distal end of said poppet within said second piston when said first and second pistons are proximate each other.

10. A hydraulic actuator, comprising:

a cylinder;

a first piston slidably disposed within said cylinder;

an actuator shaft attached to said first piston and extending through a first end of said cylinder;

a second piston slidably disposed within said cylinder, said first and second pistons being movable relative to each other to define the volumes of a first chamber between said first piston and a first end of said cylinder, a second chamber between said second piston and a second end of said cylinder, and an intermediate chamber between said first and second pistons;

a fluid passage through said first piston; and a poppet supported by said first piston, said poppet being movable relative to said first piston between a closed position blocking said fluid passage and an open position which connects said first chamber and said intermediate chamber in fluid communication with each other, said poppet being movable into said open position in response to an increase of pressure within said first chamber beyond a predetermined magnitude, said poppet having first and second effective areas against which pressure within said fluid passage can act, said pressure within said fluid passage acting against said first effective area causing a force on said poppet toward said open position, said pressure within said fluid passage acting against said second effective area causing a force on said poppet toward said closed position.

11. The actuator of claim 10, wherein:

said poppet is spring actuated to urge said poppet into said closed position.

12. The actuator of claim 10, wherein:

said first effective area is larger than said second effective area and both effective areas are defined by O-rings.

13. The actuator of claim 12, wherein:

said first and second effective areas are sized to cause said poppet to move from said closed position to said open position in response to the pressure within said first chamber exceeding a predetermined magnitude.

14. The actuator of claim 13, wherein:

said actuator is attached to an outboard motor for the purpose of moving said outboard motor from one trim position to another trim position.

15. The actuator of claim 14, further comprising:

a bleed passage formed through said first piston to allow fluid to flow from said intermediate chamber to said first chamber in response to a force on said shaft urging said first piston toward said second piston.

16. The actuator of claim 15, wherein:

said poppet is slidably disposed within a first cavity formed within said shaft and a distal end of said poppet extends into a second cavity formed within said first piston, said second cavity being a portion of said fluid passage.

17. The actuator of claim 16, wherein:

said second piston is cup-shaped to receive a distal end of said poppet within said second piston when said first and second pistons are proximate each other.

18. A hydraulic actuator, comprising:

a cylinder;

a first piston slidably disposed within said cylinder;

an actuator shaft attached to said first piston and extending through a first end of said cylinder;

a second piston slidably disposed within said cylinder, said first and second pistons being movable relative to each other to define the volumes of a first chamber between said first piston and a first end of said cylinder, a second chamber between said second piston and a second end of said cylinder, and an intermediate chamber between said first and second pistons;

a fluid passage through said first piston;

a poppet supported by said first piston, said poppet being movable relative to said first piston between a closed position blocking said fluid passage and an open position which connects said first chamber and said intermediate chamber in fluid communication with each other, said poppet being movable into said open position in response to an increase of pressure within said first chamber beyond a predetermined magnitude, said poppet having first and second effective areas against which pressure within said fluid passage can act, said pressure within said fluid passage acting against said first effective area causing a force on said poppet toward said open position, said pressure within said fluid passage acting against said second effective area causing a force on said poppet toward said closed position, said first effective area being larger than said second effective area, said first and second effective areas being sized to cause said poppet to move from said closed position to said open position in response to the pressure within said first chamber exceeding a predetermined magnitude; and a bleed passage formed through said first piston to allow fluid to flow from said intermediate chamber to said first chamber in response to a force on said shaft urging said first piston toward said second piston.

19. The actuator of claim 18, wherein:

said poppet is spring actuated to urge said poppet into said closed position, said actuator being attached to an outboard motor for the purpose of moving said outboard motor from one trim position to another trim position, said poppet being slidably disposed within a first cavity formed within said shaft and a distal end of said poppet extends into a second cavity formed within said first piston, said second cavity being a portion of said fluid passage, said second piston being cup-shaped to receive a distal end of said poppet within said second piston when said first and second pistons are proximate each other.

* * * * *